Dec. 26, 1950
H. BINTZ
2,535,718
LOCKING AND RELEASING ATTACHMENT
FOR TRACTOR BRAKE PEDALS
Filed Feb. 6, 1950
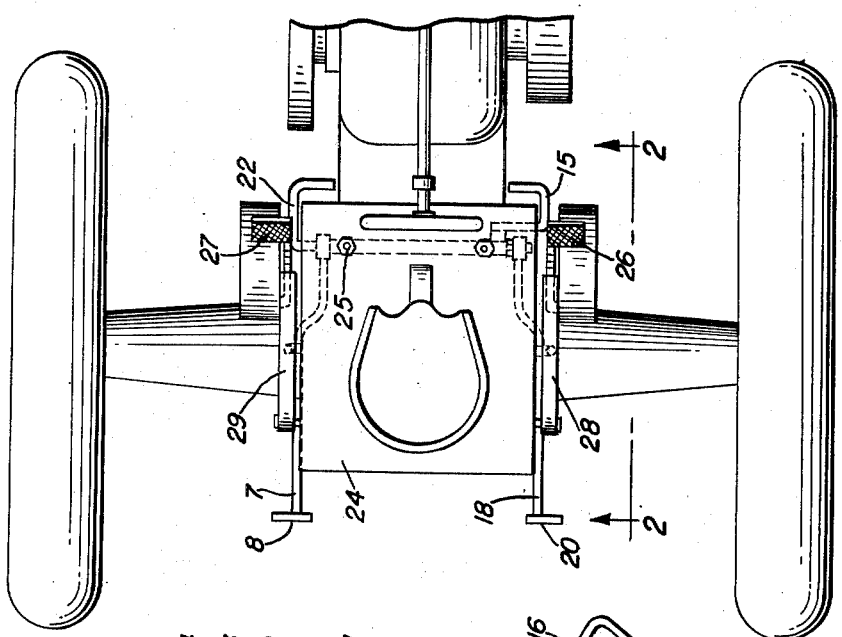
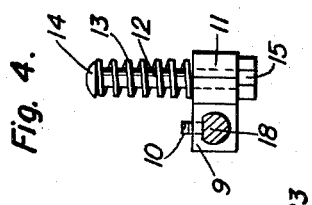
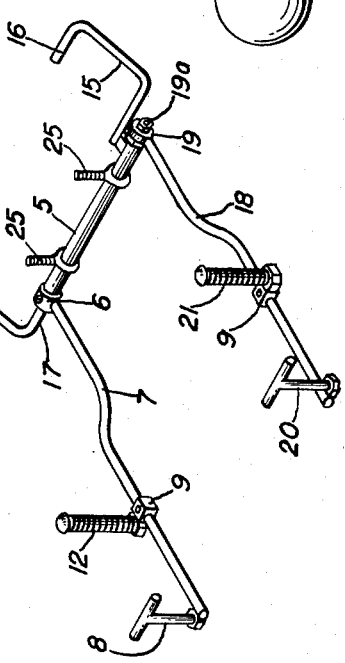
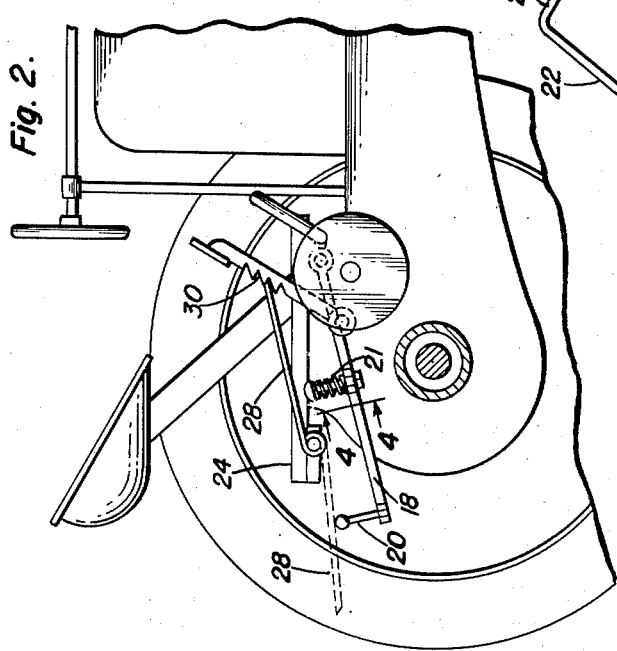
Harold Bintz
INVENTOR.

Patented Dec. 26, 1950

2,535,718

UNITED STATES PATENT OFFICE 2,535,718

LOCKING AND RELEASING ATTACHMENT FOR TRACTOR BRAKE PEDALS

Harold Bintz, Neola, Iowa

Application February 6, 1950, Serial No. 142,694

4 Claims. (Cl. 74—542)

The present invention relates to new and useful improvements in attachments for locking and releasing the brake pedals of a tractor and more particularly to an attachment of this character comprising foot pedal operated locking and releasing means obviating leaning over by the driver and latching or releasing the brake by hand and thus enabling the driver to use both hands for other purposes.

An important object of the invention is to provide a foot pedal operated attachment for either swinging the brake locking latch into brake pedal locking position, or for releasing the latch to unlock the brakes.

A further object of the invention is to provide a unitary attachment of this character whereby the right-hand brake may be locked or released by the left foot of the driver and vice versa.

A still further object is to provide an attachment of this character which may be easily and quickly installed in position on a tractor without necessitating any changes or alterations in the construction thereof and which at the same time is simple and practical in construction, strong and durable, efficient and reliable in operation, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a top plan view;

Figure 2 is a sectional view taken on the line 2—2 of Figure 1;

Figure 3 is a perspective view of the brake locking and releasing attachment removed from the tractor; and Figure 4 is an enlarged fragmentary sectional view taken on the line 4—4 of Figure 2.

Referring now to the drawings in detail, wherein for the purpose of illustration I have disclosed a preferred embodiment of the invention, the numeral 5 designates a sleeve having a collar 6 suitably secured at one end and to which an arm 7 is welded or otherwise suitably secured to position the arm radially or substantially at right angles to the sleeve.

A T-shaped latch locking member 8 is welded or otherwise suitably secured to the free end of arm 7 to extend upwardly therefrom and a collar or slide 9 is secured in a longitudinally adjusted position on the arm 7 by a set screw or the like 10.

The collar or slide 9 is provided with a guide 11 at one side in which a latch releasing pin 12 is slidably supported and held in an upstanding position by a coil spring 13 mounted on the guide and engaged under the head 14 of the pin and with the lower end of the spring resting on the guide 11. A nut 15 is threaded on the lower end of pin 12 under the guide 11.

A substantially U-shaped foot pedal 15 is welded or otherwise suitably secured to sleeve 5 at its end opposite from collar 6 and with the free end 16 of the foot pedal projecting in a forwardly upwardly inclined position while the arm 7 projects rearwardly therefrom.

A shaft 17 is rotatably mounted in the sleeve 5 with its end projecting outwardly at each end of the sleeve and a second arm 18 secured to one end of shaft 17 by means of a collar 19 threaded on the shaft and held thereon by a nut 19a at the end of sleeve 5 adjacent to foot pedal 15. Arm 18 extends rearwardly substantially parallel to arm 7 and is also provided at its rear end with an upstanding T-shaped latch locking member 20 and a yieldably supported upstanding latch releasing pin 21 adjustably mounted on arm 18 and of a construction similar to pin 12.

A U-shaped foot pedal 22 is formed at the end of shaft 17 at the end of sleeve 5 adjacent the arm 7 in a forwardly inclined position with its free end portion 23 opposed to free end portion 16 of foot pedal 15.

The device is attached to the platform 24 of a tractor by means of eye bolts and nuts or the like 25 and with the sleeve 5 rotatably positioned under the platform transversely thereof adjacent its front end so that the foot pedals 12 and 22 are positioned outwardly at the opposite side edges of the platform and inclined upwardly therefrom in a position adjacent the right and left foot brake pedals 26 and 27 of the tractor.

The arms 7 and 18 extend rearwardly at each side of the platform and outwardly therefrom for free vertical swinging movement and with the latch locking members 8 and 20 and latch releasing pins 12 and 21 positioned for engaging the ring and left brake pedal latches 28 and 29 which are pivoted to the platform for engaging the teeth 30 of the respective brake pedals.

In the operation of the device, the right and left brakes are independently applied by depressing right brake pedal 26 for the right hand brake and depressing left brake pedal 27 for the left hand brake.

When it is desired to lock the left hand brake, pedal 27 is depressed suddenly and right foot pedal 15 is also depressed suddenly which rocks sleeve 5 and swings arm 7 upwardly to engage upstanding locking member 8 under the rearwardly positioned latch 29 for the left brake pedal, shown by the dotted lines in Figure 2. Arm 7 and member 8 swings latch 29 forwardly to fall in engagement with teeth 30 of the left brake pedal to thus lock the latter.

To release latch 29 foot pedal 15 is again depressed suddenly with the right foot while the left foot depresses brake pedal 27 sufficiently to relieve pressure on the latch, and as arm 7 swings upwardly pin 12 engages latch 29 forwardly of its pivot to swing the latch rearwardly.

The same operation is carried out to lock or release the right hand brake pedal 26 by the foot pedal 22 through the use of the left foot.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. A locking and releasing attachment for operating a pivoted brake pedal locking latch of a tractor comprising an arm, a rockable member supported in a transverse position to the tractor and connected to the front end of the arm to swing the arm vertically under the brake pedal locking latch, upstanding latch actuating members carried by the arm and positioned respectively rearwardly of and forwardly of the pivot of the latch to swing the latch either forwardly into locking engagement with a brake pedal or to swing the latch rearwardly to release the brake pedal by the actuation of said rockable member, and a foot pedal connected to the rockable member for actuating the latter.

2. A locking and releasing attachment for operating pivoted locking latches of right and left brake pedals of a tractor comprising a sleeve, means rockably supporting the sleeve in a transverse position to the tractor, an arm fixed to one end of the sleeve and extending rearwardly therefrom to underlie the latch of one of the brake pedals, a foot pedal fixed to the other end of the sleeve, a shaft rotatably mounted in the sleeve, a second arm fixed to one end of the shaft and extending rearwardly therefrom to underlie the latch of the other brake pedal, a foot pedal fixed to the other end of the shaft, and upstanding latch actuating members carried by each arm and positioned respectively rearwardly of and forwardly of the pivots of the respective latches to swing the latches either forwardly into locking engagement with their associated brake pedals or to swing the latches rearwardly to release the brake pedals.

3. A locking and releasing attachment for operating pivoted locking latches of right and left brake pedals of a tractor and comprising a pair of arms positioned longitudinally under the respective latches, a pair of independently rockable coaxial transverse members supported on a part of the tractor and to which the front ends of the arms are respectively fixed for independently swinging the arms vertically, a right foot pedal attached to one of said transverse members for actuating the arm under the latch of the left brake pedal and a left foot pedal attached to the other of said transverse members for actuating the arm under the latch of the right brake pedal, and upstanding latch actuating members carried by each arm and positioned respectively in front of and behind the pivots of the latches to swing the latches either forwardly into locking engagement with their associated brake pedals or to swing the latches rearwardly to release the brake pedals.

4. The combination of claim 3, wherein at least one of the latch actuating members of each arm is yieldably supported and slidably adjustable on its arm.

HAROLD BINTZ.

REFERENCES CITED

The following references are of record in the file of this patent:

UNITED STATES PATENTS

| Number | Name | Date |
| --- | --- | --- |
| 2,028,198 | Elliott | Jan. 21, 1936 |
| 2,450,943 | Downing | Oct. 12, 1948 |